(12) United States Patent
Kuznicki et al.

(10) Patent No.: US 6,761,875 B2
(45) Date of Patent: Jul. 13, 2004

(54) RARE EARTH SILICATE MOLECULAR SIEVES

(75) Inventors: Steven M. Kuznicki, Whitehouse Station, NJ (US); Richard M. Jacubinas, Hillsborough, NJ (US)

(73) Assignee: Engelhard Corporation, Iselin, NJ (US)

( * ) Notice: Subject to any disclaimer, the term of this patent is extended or adjusted under 35 U.S.C. 154(b) by 162 days.

(21) Appl. No.: 09/946,741

(22) Filed: Sep. 5, 2001

(65) Prior Publication Data

US 2003/0049200 A1 Mar. 13, 2003

(51) Int. Cl.⁷ .............................................. C01B 39/46
(52) U.S. Cl. ...................................... 423/718; 423/713
(58) Field of Search .................................. 423/718, 713

(56) References Cited

U.S. PATENT DOCUMENTS

| | | | |
|---|---|---|---|
| 3,769,386 A | * 10/1973 | Rundell et al. | 423/701 |
| 4,681,747 A | * 7/1987 | Desmond et al. | 423/713 |
| 4,701,431 A | * 10/1987 | Pine | 502/73 |
| 4,861,570 A | 8/1989 | Kuehl et al. | |
| 4,938,939 A | 7/1990 | Kuznicki | |
| 5,015,453 A | 5/1991 | Chapman | |
| 5,208,006 A | 5/1993 | Kuznicki et al. | |
| 5,232,675 A | * 8/1993 | Shu et al. | 423/328.2 |
| 5,677,254 A | * 10/1997 | Nojima et al. | 502/65 |
| 5,869,021 A | * 2/1999 | Wang et al. | 423/718 |
| 5,888,472 A | 3/1999 | Bem et al. | |
| 5,891,417 A | 4/1999 | Bem et al. | |
| 6,007,790 A | 12/1999 | Bedard et al. | |

FOREIGN PATENT DOCUMENTS

GB     2033358 A   *   5/1980

OTHER PUBLICATIONS

"The First Microporous Framework Cerium Silicate" By Rocha, et al., Alkewandte Casillie International Ed, 2000, 39, No. 18.

"TSeidite—(Ce) $Na_4SrTiSi_8O_{22}F$ $^K5H_2C$—New Mineral with Zeolite Properties" Proc. RMS H 4, 1998.

* cited by examiner

Primary Examiner—David Sample
(74) Attorney, Agent, or Firm—Russell G. Lindenfeldar

(57) ABSTRACT

Rare earth silicate octahedral/tetrahedral molecular sieves with the octahedral chains as rare earth centers exhibit enhanced thermal and hydrothermal stability.

5 Claims, No Drawings

RARE EARTH SILICATE MOLECULAR SIEVES

FIELD OF THE INVENTION

This invention relates to novel rare earth silicate molecular sieve compositions and to methods for the preparation thereof. More particularly, the invention is directed to high temperature stable molecular sieves constructed predominantly from chains of octahedrally coordinated rare earth lanthanides and actinides with tetrahedral bridging units such as from silicon.

BACKGROUND OF THE INVENTION

Since the discovery by Milton and coworkers (U.S. Pat. Nos. 2,882,243 and 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge-compensating cations are electrostatically and not covalently bound to the aluminosilicate framework, they are generally base exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055; 4,603,040; and 4,606,899, totally new aluminosilicate framework structures are being discovered at a negligible rate.

With slow progress in the discovery of new aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials.

It has been believed for a generation that phosphorus could be incorporated, to varying degrees, in a zeolite type aluminosilicate framework. In the more recent past (JACS 104, pp. 1146 (1982); proceedings of the $7^{th}$ International Zeolite Conference, pp. 103–112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $P^{+5}$ or the site diluting effect of incorporating effectively neutral tetrahedral +4 metal into an aluminosilicate framework. As a result, extensive research in the research community has failed to demonstrate significant utility for any of these materials.

A series of zeolite-like "framework" silicates have been synthesized, some of which have larger uniform pores than are observed for aluminosilicate zeolites. (W. M. Meier, Proceedings of the $7^{th}$ International Zeolite Conference, pp. 13–22 (1986)). While this particular synthesis approach produces materials which, by definition, totally lack active, charged sites, back implantation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso, et. al.; Proceedings of the $5^{th}$ International Zeolite Conference; pp. 40–48 (1980)); J. W. Ball, et. al.; Proceedings of the $7^{th}$ International Zeolite Conference; pp. 137–144 (1986); U.S. Pat. No. 4,280,305 to Kouenhowen, et. al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titanium silicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego, et. al., Proceedings of $7^{th}$ International Zeolite conference, p. 129 (1986)). For all but one end member of this series of materials (denoted TS materials), the presented XRD patterns indicate phases too dense to be molecular sieves. In the case of the one questionable end member (denoted TS-26), the XRD pattern might possibly be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov, et. al.; Zapiski Vses Mineralog. Obshch., pp. 54–62 (1973)). The published XRD pattern was challenged and a proposed structure reported in a later article entitled "The OD Structure of Zorite", Sandomirskii, et. al., Sov. Phys. Crystallogr. 24(6), November–December 1979, pp. 686–693.

No further reports on "titanium zeolites" appeared in the open literature until 1983 when trace levels of tetrahedral TI(IV) were reported in a ZSM-5 analog. (M. Taramasso, et. al.; U.S. Pat. No. 4,410,501 (1983); G. Perego, et. al.; Proceedings of the $7^{th}$ International Zeolite Conference; p. 129 (1986)). A similar claim appeared from researchers in mid-1985 (EPA 132,550 (1985)). The research community reported mixed aluminosilicate-titanium (IV) (EPA 179,876 (1985); EPA 181,884 (1985) structures which, along with TAPO (EPA 121,232 (1985) systems, appear to have no possibility of active titanium sites. As such, their utility, has been limited to catalyzing oxidation.

In U.S. Pat. No. 4,938,939, issued Jul. 3, 1990, Kuznicki disclosed a new family of synthetic, stable crystalline titaniumsilicate molecular sieve zeolites which have a pore size of approximately 3–4 Angstrom units and a titania/silica mole ratio in the range of from 1.0 to 10. The entire content of U.S. Pat. No. 4,938,939 is herein incorporated by reference. These titanium silicates have a definite X-ray diffraction pattern unlike other molecular sieve zeolites and can be identified in terms of mole ratios of oxides as follows.

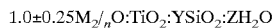

$1.0\pm0.25M_{2/n}O:TiO_2:YSiO_2:ZH_2O$ wherein M is at least one cation having a valence of n, Y is from 1.0 to 10.0, and Z is from 0 to 100.

The original cations M can be replaced at least in part with other cations by well-known exchange techniques. Preferred replacing cations include hydrogen, ammonium, rare earth, and mixtures thereof. Members of the family of molecular sieve zeolites designated ETS-4 in the rare earth-exchanged form have a high degree of thermal stability of at least 450° C. or higher depending on cationic form, thus rendering them effective for use in high temperature catalytic processes. ETS zeolites are highly adsorptive toward molecules up to approximately 3–5 Angstroms in critical diameter, e.g. water, ammonia, hydrogen sulfide, $SO_2$, and n-hexane and are essentially non-adsorptive toward molecules which are larger than 5 Angstroms in critical diameter.

A large pore crystalline titanium molecular sieve composition having a pore size of about 8 Å units has also been developed by the present assignee and is disclosed in U.S. Pat. No. 4,853,202, which patent is herein incorporated by reference. This crystalline titanium silicate molecular sieve has been designated ETS-10.

The new family of microporous titanosilicates developed by the present assignee including ETS-4, ETS-10, ETAS-10 (titanium aluminum silicates, U.S. Pat. No. 5,244,650), and generically denoted as ETS, are constructed from fundamentally different building units than classical aluminosilicate zeolites. Instead of interlocked tetrahedral metal oxide units as in classical zeolites, the ETS materials are composed of interlocked octahedral chains and classical tetrahedral rings. In general, the chains consist of six oxygen-coordinated titanium octahedra wherein the chains are connected three dimensionally via tetrahedral silicon oxide units or bridging titanosilicate units. The inherently different crystalline titanium silicate structures of these ETS materials have been shown to produce unusual and unexpected results when compared with the performance of aluminosilicate zeolite molecular sieves. For example, the counter-balancing cations of the crystalline titanium silicates are associated with the charged titania chains and not the uncharged rings which form the bulk of the structure. In ETS-10, this association of cations with the charged titania chains is widely recognized as resulting in the unusual thermodynamic interactions with a wide variety of sorbates which have been found. This includes relative weak binding of polar species such as water and carbon dioxide and relatively stronger binding of larger species, such as propane and other hydrocarbons. These thermodynamic interactions form the heart of low temperature dessication processes as well as evolving Claus gas purification schemes. The unusual sorbate interactions are derived from the titanosilicate structure, which places the counter-balancing cations away from direct contact with the sorbates in the main ETS-10 channels.

In recent years, scores of reports on the structure, adsorption and, more recently, catalytic properties of wide pore, thermally stable ETS-10 have been made on a worldwide basis. This worldwide interest has been generated by the fact that ETS-10 represents a large pore thermally stable molecular sieve constructed from what had previously been thought to be unusable atomic building blocks.

Although ETS-4 was the first molecular sieve discovered which contained the octahedrally coordinated framework atoms and as such was considered an extremely interesting curiosity of science, ETS-4 has been virtually ignored by the world research community because of its small pores and reported low thermal stability. Recently, however, researchers of the present assignee have discovered a new phenomenon with respect to ETS-4. In appropriate cation forms, the pores of ETS-4 can be made to systematically shrink from slightly larger than 4 Å to less than 3 Å during calcinations, while maintaining substantial sample crystallinity. These pores may be "frozen" at any intermediate size by ceasing thermal treatment at the appropriate point and returning to ambient temperature. These controlled pore size materials are referred to as CTS-1 (contracted titanosilicate-1) and are described in commonly assigned, U.S. Pat. No. 6,068,682, issued May 30, 2000. Thus, ETS-4 may be systematically contracted under appropriate conditions to CTS-1 with a highly controllable pore size in the range of 3–4 Å. With this extreme control, molecules in this range may be separated by size, even if they are nearly identical. The systematic contraction of ETS-4 to CTS-1 to a highly controllable pore size has been named the Molecular Gate™ effect. This effect is leading to the development of separation of molecules differing in size by as little as 0.1 Angstrom, such as $N_2/O_2$ (3.6 and 3.5 Angstroms, respectively), $CH_4/N_2$ (3.8 and 3.6 Angstroms), or $CO/H_2$ (3.6 and 2.9 Angstroms). High pressure $N_2/CH_4$ separation systems are now being developed. This profound change in adsorptive behavior is accompanied by systematic structural changes as evidenced by X-ray diffraction patterns and infrared spectroscopy.

An example of a molecular sieve containing at least some rare earth atoms in octahedral framework positions is a titanium-based mineral called seidite. While an impure mixed material, seidite is clearly an octahedral/tetrahedral molecular sieve as is clear from the structure of the mineral given in Zap.Vseross.Mineral.0-va (1998), 127(4), pp. 94–106. The mineral seidite has a designated formula $Na_3CeTiSi_6O_{17}.5H_2O$ based on a wet chemical analysis. Although in the aforementioned article, the cerium is described as occluded within the structure, it is believed that there may be some cerium in the framework positions. If a molecular sieve could be made with all or predominantly all of the octahedral chains as rare earth centers, qualitatively new, potentially more stable molecular sieves could result.

Kuznicki, et al. in U.S. Pat. No. 5,208,006 disclosed large pore crystalline molecular sieves having at least one octahedrally coordinated site comprising titanium and at least tetrahedrally coordinated silicon in the framework and wherein the molecular sieve has an X-ray powder diffraction pattern substantially the same as ETAS-10 or ETS-10. The octahedrally coordinated metal site can be titanium alone or mixtures of titanium and other metals, preferably zirconium, niobium, cerium, chromium, iron, lanthanum, hafnium, and mixtures thereof. The atomic ratio of octahedral titanium to the total of any other octahedral metals is disclosed as ranging from 99:1 to 1:10, preferably from 3:1 to 1:2 and most preferably from 2:1 to 1:1.

In U.S. Pat. Nos. 5,888,472; 5,891,417 and 6,007,790, assigned to UOP, there are disclosed what are designated crystalline molecular sieves having either zirconium or indium oxide octahedral units and silicate tetrahedral units. The zirconium and indium can be replaced, at least in part, by other metals including cerium. All these materials are described as microporous and being molecular sieves. However, it is most likely that these materials are simply layered materials without a three dimensionally porous framework and concomitant molecular sieving properties. Thus, in the only example in any of the mentioned patents directed to actual adsorption, so little oxygen was adsorbed, i.e., less than 2½% at −183° C., that it is doubtful the structure of a molecular sieve framework was formed.

SUMMARY OF THE INVENTION

In accordance with the present invention, a novel rare earth lanthanide or actinide silicate molecular sieve is formed comprising predominantly lanthanide or actinide octahedrally coordinated chains and tetrahedral bridging units, typically of silicon. In particular, a substantially pure rare earth silicate has been generated using a rare earth metal as a substitution for titanium in a typical ETS-4 type synthesis mixture. The molecular sieve which is formed, however, is unlike the mineral seidite and has a structure which does not parallel the titanium based ETS-4.

The rare earth silicate molecular sieve is formed in accordance with this invention by heating a reaction mixture containing a rare earth lanthanide or actinide source, a source of silica, a source of alkalinity, and water to a temperature of from about 100° C. to 300° C. for a period time ranging from 8 hours to 40 days. Concentration of the components contained in the reaction mixture are the same as that used in forming ETS-4 except that the rare earth source is used in place of the titanium source.

The rare earth silicate molecular sieves are adsorptive, ion-exchangeable and catalytically active. The novel materials exhibit dramatically increased thermal stability relative to ETS and aluminumsilicate zeolite compositions.

DETAILED DESCRIPTION OF THE INVENTION

The present invention is directed to novel rare earth lanthanide or actinide silicate molecular sieve zeolites comprising rare earth octahedrally coordinated chains connected with tetrahedral silica bridging units. The rare earth silicates have a pore size of approximately 3–5 Å units and are the first molecular sieve silicate formed predominantly from rare earth oxides. The crystalline rare earth silicate molecular sieve zeolites of the present invention can be identified in terms of mole ratios of oxides as follows:

$$1.0 \pm 0.25 \, M_{2/n} : cXO_\alpha : dZO_\beta : eH_2O \quad (I)$$

wherein X is a rare earth, or mixtures thereof; Z is silicon or silicon and at least one other tetrahedral framework atom; M is at least one cation of valence n; α is one half the valence of X; β is one half the valence of Z; c is >0 to 2; d is 1–10; and e is from 0 to 100. In a preferred embodiment, M is a mixture of alkali metal cations, particularly sodium and potassium, c is at least 1.0 and d is at least 5.0.

The original cations M can be replaced at least in part with other cations by well-known exchange techniques. Preferred replacing cations include hydrogen, ammonium, alkaline earth, rare earth and mixtures thereof.

In the above formula (I), X is a rare earth, or mixture thereof selected from the group consisting of the transition metals from the lanthanide and actinide series of the periodic table including lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, and lawrencium.

The rare earth silicate molecular sieve zeolites have an ordered crystalline structure and have substantially the same X-ray powder diffraction pattern regardless of the specific rare earth utilized in molecular sieve formation, although slight differences between the XRD patterns for the various rare earth silicates may be expected.

The rare earth silicate molecular sieve zeolites of the present invention are prepared in accordance with aforementioned U.S. Pat. No. 4,938,939 from a reaction mixture containing a rare earth source in place of a titanium source. Non-limiting examples of rare earth compounds which can be used include cerium chloride, cerium sulfate, cerium nitrate, cerium acetate, ytterbium chloride, ytterbium sulfate, ytterbium acetate, lanthanum chloride, lanthanum sulfate, lanthanum nitrate, lanthanum acetate, actinium chloride, actinium sulfate, actinium nitrate, and actinium acetate. The reaction mixture further contains a source of silica; a source of alkalinity such as an alkali metal hydroxide; water and, optionally, an alkali metal fluoride. The composition of the reaction mixture in terms of mole ratios fall within the ranges as set forth in Table 1.

TABLE 1

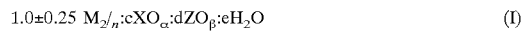

|  | Broad | Preferred | Most Preferred |
|---|---|---|---|
| $SiO_2/X$ | 1–15 | 1–10 | 4–10 |
| $H_2O/SiO_2$ | 2–100 | 5–50 | 15–30 |
| $M_n/SiO_2$ | 0.1–10 | .5–5 | 0.5–2 | wherein X indicates a rare earth including lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, and lawrencium; and M indicates the cations of valence n derived from the alkali metal hydroxide and potassium fluoride and/or alkali metal salts used for preparing the rare earth silicate according to the invention.

In a preferred embodiment of the present invention, the reaction mixture is prepared as two separate mixtures that are then combined to form the reaction mixture. The first mixture contains a source of silica, a source of alkalinity such as an alkali metal hydroxide, water and, optionally, an alkali metal fluoride, e.g. KF. The second mixture contains the rare earth source, optional electrolyte and water. The combined reaction mixture is heated to a temperature of from about 100° C. to 300° C. for a period of time ranging from about 8 hours to 40 days, or more. The hydrothermal reaction is carried out until crystals are formed and the resulting crystalline product is thereafter separated from the reaction mixture by cooling to room temperature filtering and water washed. The reaction mixture can be stirred although it is not necessary. It has been found that when using gels, stirring is unnecessary but can be employed. When using sources of rare earth lanthanides or actinides which are solids, stirring is beneficial. The preferred temperature range is 150° C. to 250° C. for a period of time ranging from 12 hours to 15 days. Crystallization is performed in a continuous or batchwise manner under autogeneous pressure in an autoclave or static bomb reactor. Following the water washing step, the crystalline rare earth silicate is dried at temperatures of 100° to 400° F. for periods ranging up to 30 hours.

The method for preparing rare earth silicate compositions comprises the preparation of a reaction mixture constituted by sources of silica, sources of rare earth lanthanides or actinides, sources of alkalinity such as sodium and/or potassium oxide and water having a reagent molar ratio composition as set forth in Table 1. Optionally, sources of fluoride such as potassium fluoride can be used, particularly to assist in solubilizing a solid rare earth source such as $CeO_2$ or $Ce_2O_3$.

The silica source includes most any reactive source of silicon such as silica, silica hydrosol, silica gel, silicic acid, alkoxides of silicon, alkali metal silicates, preferably sodium or potassium, or mixtures of the foregoing.

The rare earth source is preferably in the form of a soluble salt such as cerium chloride, cerium sulfate, cerium nitrate, cerium acetate, ytterbium chloride, ytterbium sulfate, ytterbium acetate, lanthanum chloride, lanthanum sulfate, lanthanum nitrate, lanthanum acetate, actinium chloride, actinium sulfate, actinium nitrate, and actinium acetate. Rare earth oxides can also be used in particular, rare earth oxides which can be rendered soluble in the reaction mixture. In-situ rare earth silicate molecular sieves prepared from insoluble solid rare earth oxides may be possible.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 10 to 12. The alkali metal hydroxide serves as a source of sodium oxide which can also be supplied by an aqueous solution of sodium silicate.

The rare earth silicate molecular sieve zeolites prepared according to the invention may contain minor amounts of transition metals substituted for the lanthanides or actinides along the chain of octahedrally coordinated rare earth sites. Up to 45%, preferably up to 30%, and most preferably no more than 10% of the rare earths can be substituted with other transition metals. Non-limiting examples of transition metals which can be substituted for the octahedrally coordinated rare earth metals include Zr, Nb, Mo, Ru, Pd, Ag, In, Sn, Ta, W, Re, Ir, Pt, Au, Ti, Cr, Mn, Fe, Co, Ni, Cu and Zn.

The crystalline rare earth silicate as synthesized can have the original cations thereof replaced by a wide variety of others according to techniques well known in the art. Typical replacing cations would include hydrogen, ammonium, alkyl ammonium and aryl ammonium and metals, including mixtures of the same. The hydrogen form may be prepared, for example, by substitution of original sodium with ammonium. The composition is then calcined at a temperature of, say, 1000° F. causing evolution of ammonia and retention of hydrogen in the composition, i.e., hydrogen and/or decationized form.

The crystalline rare earth silicates are then preferably washed with water and dried at a temperature ranging from 150° F. to about 600° F. and may thereafter be calcined in air or other inert gas.

Regardless of the synthesized form of the rare earth silicate, the spatial arrangement of atoms which form the basic crystal lattices remain essentially unchanged by the replacement of sodium or other alkali metal or by the presence in the initial reaction mixture of metals in addition to sodium, as determined by an X-ray powder diffraction pattern of the resulting rare earth silicate. The X-ray diffraction patterns of such products will be essentially identical regardless of the rare earth metal used although some shifts in the peaks are to be expected between XRD patterns of varying rare earth silicates especially between those of large atomic size differences. Peak intensities, even for the same rare earth silicate may vary depending on the level of hydration of the sieve. Table 2 below sets forth the XRD pattern of cerium silicate.

The crystalline rare earth silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The rare earth silicate can be extruded before drying or dried or partially dried and then extruded. For use as adsorbents, membranes of such rare earth silicates may be useful.

The novel rare earth silicate materials of this invention are useful as adsorbents to separate gaseous and liquid mixtures and as catalysts. When particularly used as a catalyst, it is desired to incorporate the new crystalline rare earth silicate with another material resistant to the temperatures and other conditions employed in organic processes. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystalline rare earth silicate, i.e., combined therewith which is active, tends to improve the conversion and/or selectivity of the catalyst in certain organic conversion processes such as the cracking of n-hexane. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline rare earth silicate described herein include the montmorillonite and kaolin family, which families include the sub-bentonites and the kaolins known commonly as Dixie, McNamee, Georgia and Florida or others in which the main constituent is halloysite, kaolinite, dickite, nacrite or anauxite. Such clays can be used in the raw state as originally mined or initially subjected to calcinations, acid treatment or chemical modification.

In addition to the foregoing materials, the crystalline rare earth silicate may be composited with a porous matrix material such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 1% to 90% by weight and more usually in the range of about 2% to about 50% by weight of the composite.

As is known in the art, it is desirable to limit the alkali metal content of materials used for acid catalyzed reactions. This is usually accomplished by ion exchange with hydrogen ions or precursors thereof such as ammonium.

In order to more fully illustrate the nature of the invention and a manner of practicing the same, the following examples illustrate the best mode now contemplated.

EXAMPLE I

In this Example, the preparation of a ECeS-4 is set forth. The following ingredients were mixed in a beaker.

| Component | Amount |
|---|---|
| Sodiumsilicate[1] | 173.59 grams |
| NaOH (s) | 6.93 grams |
| KF.2H$_2$O | 26.01 grams |
| H$_2$O | 90.03 grams |

N-Brand ™

1. N-Brand®

The following ingredients were separately mixed in another beaker.

| Component | Amount |
|---|---|
| CeCl$_3$.7H$_2$O | 54.55 grams |
| H$_2$O | 75.07 grams |
| NaCl | 36.09 grams |

The mixtures from the two beakers were then blended together with H$_2$O added as necessary to make a "creamy" homogenous gel with a pH of 1 gram in 99 grams of H$_2$O equal to 10.7.

The mixed reactants were poured into Teflon-lined autoclaves, which were sealed. The amounts of gel in each autoclave was as follows:

| Bomb | Mass Gel |
|---|---|
| 1 | 63.25 |
| 2 | 63.05 |
| 3 | 62.59 |
| 4 | 63.12 |
| 5 | 63.70 |
| 6 | 63.07 |

The autoclaves were heated to 225° C. and maintained at temperature for 3 days. The product from each autoclave was separately filtered and washed with hot water and dried at 100° C. Chemical analysis of the product was determined to be as follows:

(NaK)$_2$O:1.6CeO$_2$:7.25SiO$_2$

Table 2 below shows the significant peaks of an X-ray diffraction pattern of the product formed as above-described. The XRD pattern for each sample was the same. The XRD pattern was formed on a Philips APD37320 diffractometer equipped with a theta compensator. The theta compensator maintains a constant area of illumination on the sample, so X-ray intensities obtained from a theta compensated unit are not directly comparable to those of a non-compensated unit. Thus, all values mentioned in the specification and claims with regard to the novel materials of this invention were determined by the theta compensated X-ray equipment. The radiation was the K-alpha doublet of copper, and a scintillation counter spectrometer was used. The peak heights, I, and the positions as a function of 2 times theta, where theta is the Bragg angle were read from the spectrometer chart. From these, the relative intensities, 100 I/I$_0$, where I$_0$ is the intensity of the strongest line or peak, and d, the interplanar spacing in angstroms, corresponding to the recorded lines, were calculated and recorded in Table 2.

TABLE 2

| D-spacing, Å | Range, +/− | Relative Intensity* I/I$_0$ |
|---|---|---|
| 11.90 | 0.15 | s |
| 6.98 | 0.08 | mw |
| 6.55 | 0.04 | w |
| 6.00 | 0.03 | mw |
| 5.07 | 0.03 | w |
| 4.43 | 0.02 | m |
| 3.99 | 0.02 | m |
| 3.74 | 0.01 | mw |
| 3.48 | 0.01 | m |
| 3.41 | 0.01 | m |
| 3.33 | 0.01 | s |
| 3.26 | 0.01 | m |
| 3.08 | 0.01 | m |
| 3.04 | 0.01 | mw |
| 3.00 | 0.01 | s |
| 2.88 | 0.01 | mw |
| 2.76 | 0.01 | mw |
| 2.64 | 0.01 | w |
| 2.54 | 0.01 | w |
| 2.45 | 0.01 | mw |
| 2.40 | 0.01 | w |

*s = strong (>50);
m = medium (20–50);
mw = medium–weak (10–20);
w = weak (<10)

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A crystalline molecular sieve having a composition consisting of in terms of mole ratios of oxide as follows:

1.0±0.25 M$_{2/n}$O:cXO$_\alpha$:dZO$_\beta$:0–100H$_2$O wherein X is cerium; Z is silicon or silicon and at least one other tetrahedral framework atom; M is at least one cation of valence n; α is one half the valence of X; β is one half the valence of Z; c is >0–2; d is 1–10, wherein said molecular sieve is characterized by having an X-ray diffraction pattern as set forth in Table 2 of the specification.

2. The crystalline molecular sieve according to claim 1, wherein X is a mixture of cerium and at least one other transition metal.

3. The crystalline molecular sieve according to claim 1, wherein X is essentially cerium.

4. The crystalline molecular sieve according to claim 1, wherein said sieve has an average pore size of 3 to 5 Å.

5. The crystalline molecular sieve according to claim 1, wherein said at least one other transition metal is titanium.

* * * * *